(12) United States Patent
Dersch et al.

(10) Patent No.: US 8,308,881 B2
(45) Date of Patent: Nov. 13, 2012

(54) ULTRASONIC HOT SEALING METHOD WITH REGULATION OF SEALING PRESSURE

(75) Inventors: Volker Dersch, Gruenberg (DE); Roland Kuhn, Reiskirchen (DE); Erhard Lutz, Muecke-Sellnrod (DE)

(73) Assignee: Rovema GmbH, Fernwald-Annerod (DE)

( * ) Notice: Subject to any disclaimer, the term of this patent is extended or adjusted under 35 U.S.C. 154(b) by 0 days.

(21) Appl. No.: 13/286,560

(22) Filed: Nov. 1, 2011

(65) Prior Publication Data
US 2012/0125521 A1 May 24, 2012

(30) Foreign Application Priority Data
Nov. 2, 2010 (DE) .......................... 10 2010 050 008
Mar. 31, 2011 (DE) .......................... 10 2011 006 506

(51) Int. Cl.
*B32B 37/00* (2006.01)
(52) U.S. Cl. ....... 156/64; 156/73.1; 156/308.4; 493/209
(58) Field of Classification Search .................. 156/64, 156/73.1, 290, 292, 308.2, 308.4; 493/189, 493/209
See application file for complete search history.

(56) References Cited

U.S. PATENT DOCUMENTS
4,583,347 A * 4/1986 Nielsen ........................... 53/434
4,922,686 A * 5/1990 Segota ........................... 53/434

FOREIGN PATENT DOCUMENTS
DE 4425207 A1 1/1996
DE 102004049376 A1 4/2006

* cited by examiner

*Primary Examiner* — James Sells
(74) *Attorney, Agent, or Firm* — Fredrikson & Byron, P.A.

(57) ABSTRACT

The invention relates to a method for generating a welding force and/or a welding pressure for a welding jaw, in particular a welding jaw of a cross-sealing station of a vertical tubular bag machine, in which the sealing force or a sealing parameter, which correlates with the sealing force, in particular the sealing pressure or the drive power of the drive, is predetermined by a control unit during the sealing time, such that the sealing force runs along a sealing force curve within the sealing time, such that the sealing force curve has a first relative sealing force maximum with a sealing force and at least one second relative sealing force maximum with a sealing force, such that the sealing force at the first sealing force maximum is higher than the sealing force at the second sealing force maximum.

14 Claims, 5 Drawing Sheets

ULTRASONIC HOT SEALING METHOD WITH REGULATION OF SEALING PRESSURE

CROSS-REFERENCE TO RELATED APPLICATIONS

Figure 1:
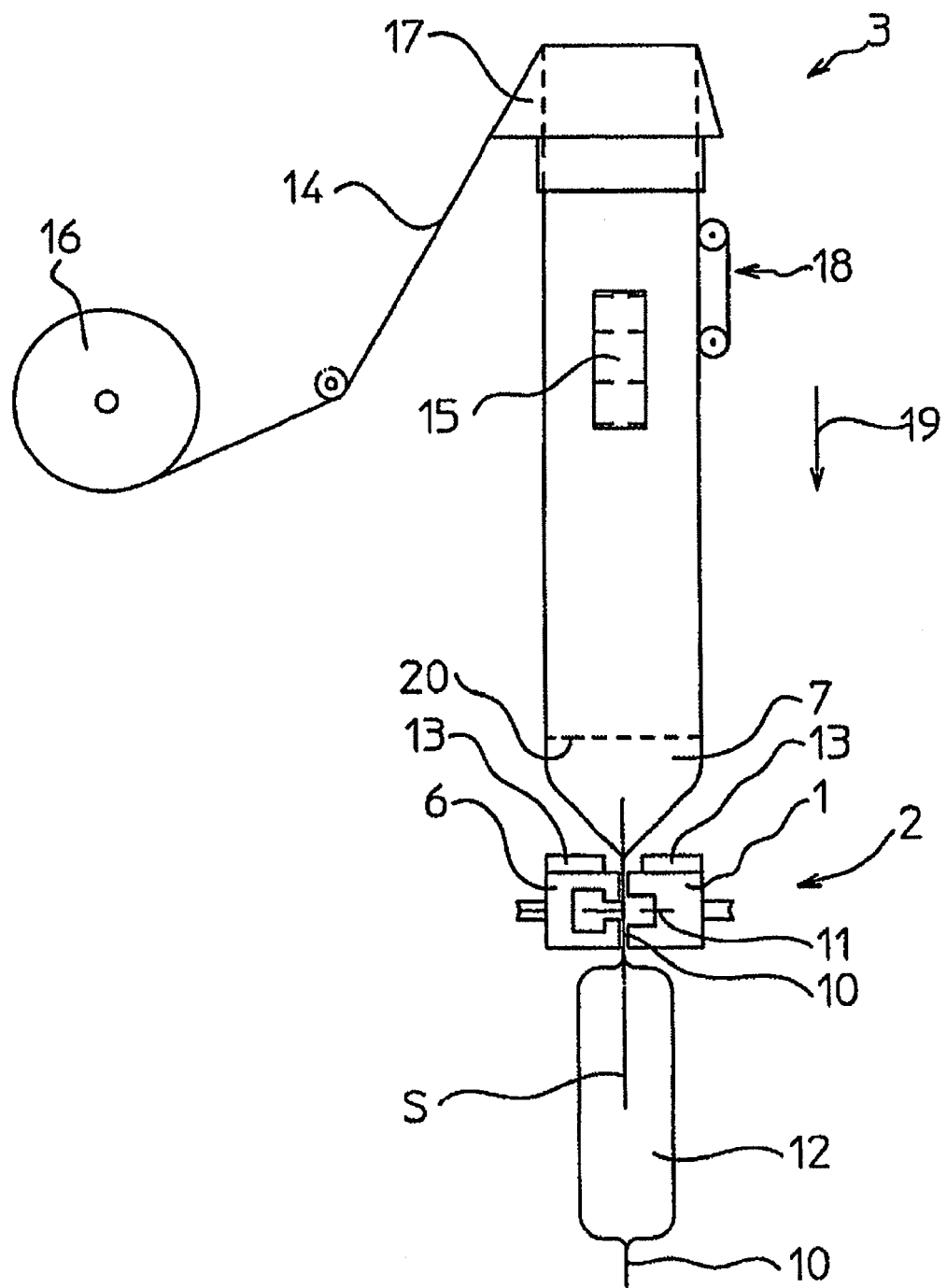

This patent application claims the benefit of priority from German Patent Applications Nos. 10 2010 050 008.9, filed on Nov. 2, 2010, and 10 2011 006 506.7, filed on Mar. 31, 2011, the contents of which are incorporated herein by reference in their entireties.

The proposed embodiments of the invention relate to packaging machine construction and a method for creating a welding force and/or a welding pressure in ultrasonic film sealing, in particular in a cross-sealing station of a vertical tubular bag machine.

From DE 44 25 207 A, it is known that a welding jaw of a cross-sealing station of a vertical tubular bag machine may be moved along a closed path. The path here has a straight section, which is provided for contact with a tubular film compressed between the welding jaw and the second opposing welding jaw. The tubular film and the welding jaws are moved further in the direction of the straight section at the same speed or at a different speed in order to weld the tubular film by means of heat introduced into the tubular film via the sealing surfaces of the welding jaws at a pressure exerted in a sealing plane within a sealing time under a sealing force. A drive is provided to move the welding jaw in a direction normal to a surface of the resistance in order to perform the welding operation in a stationary position or along an effective sealing path within the sealing time, and the sealing force can be preselected.

In the case of another vertical tubular bag machine, only one drive is provided for moving two welding jaws that are movable toward and away from one another only in the horizontal direction, moving each along a linear path, to weld a tubular film across its direction of conveyance when the film is at a standstill.

DE 10 2004 049 376 A1 describes a sealing method in which the sealing force is predetermined by a control unit of the drive during the sealing time and is thus preselectable as a function of time in any desired manner during the entire sealing time.

The known methods and devices have the disadvantage that the sealing force curve and/or the sealing pressure curve resulting from the amount of sealing area and the sealing force always has/have only a relative maximum.

The sealing force curve has a parabolic characteristic in the method described in DE 10 2004 049 376 A1. All the known methods are characterized jointly in that the characteristic of the sealing force curve rises up to a maximum force, is optionally kept constant for a certain period of time at this maximum force and then declines along the sealing force curve to the zero level when the jaws are opened. It is characteristic here that the sealing force increases continuously until reaching the maximum sealing force, such that this increase in the sealing force may in principle have any sealing force curve, for example, a linear, arc-shaped or parabolic curve, until reaching the maximum force. With the known sealing method, the goal is to achieve the maximum force as soon as possible, which means that after the sealing jaws are closed, the sealing force should be increased at the greatest possible rate of increase.

In ultrasonic film sealing, the problem is that the welds are often closed incompletely or with an inadequate sealing quality. Studies have now shown that this is due in particular to the fact that when welding energy is applied ultrasonically, the film material melts in a different way than when welding energy is applied by direct action of heat. When welding energy is applied ultrasonically, the film material heats up differently than with direct action of heat, not from the outside to the inside, but instead from the inside to the outside. In other words, in ultrasonic welding, this means that the inner layers of the material will melt first, but the outer layers need longer to melt. The known strategies for cross-sealing through direct action of heat can therefore be applied to cross-sealing by ultrasonic welding only to a limited extent. The sealing pressure applied during cross-sealing has a great influence on the result of the film sealing and cross-sealing. Studies have now shown that the known methods for regulation of the sealing pressure in cross-sealing through direct application of heat cannot be transferred directly to methods for regulating the sealing pressure in cross-sealing by ultrasonic welding.

Against the background of this prior art, an object of the present invention is therefore to propose a novel sealing method for creating a welding force and/or a welding pressure for a welding jaw, in particular a welding jaw of a cross-sealing station in a vertical tubular bag machine, which can be used in cross-sealing by ultrasonic welding in order to improve the film sealing quality.

The sealing method according to the embodiments of the present invention is based on the fundamental idea that the sealing force curve acting on the tubular film has a first relative sealing force maximum and a second relative sealing force maximum, such that the sealing force of the first sealing force maximum is higher than the sealing force of the second sealing force maximum. In other words, this means that in sealing the tubular film and in running through the sealing force curve accordingly, the sealing force rises first up to the first sealing force maximum. Then after passing through the first sealing force maximum, the sealing force drops, and in the remaining course, the sealing force passes through a second relative sealing force maximum. The sealing force of the second sealing force maximum is lower than the sealing force of the first sealing force maximum. It is naturally also conceivable that the sealing force may run through additional further relative sealing force maximums. Fundamentally, with regard to the invention, it should be pointed out that the sealing force, the sealing pressure and the motor drive power of the sealing jaws are variables that are to be regarded as correlating parameters.

Since the higher first sealing force maximum occurs before the lower second sealing force maximum, the result is that the sealing force rises to the highest level, at the start of the sealing process, i.e., in a time frame during which the film material is heated initially only in the core layers. This sealing force level is then sufficient to input the ultrasonic waves from the welding jaws into the material of the tubular film. When the tubular film has been heated to a sufficient extent, the sealing force may then drop to the second sealing force maximum and remain there. Due to the reduction in the sealing force in the second part of the sealing operation until the start of the second sealing force maximum, a substantial portion of the drive energy may be saved for applying the sealing force. Furthermore, the drive for driving the sealing jaws, which is necessary to apply the sealing force, may be designed to be weaker accordingly, thus yielding a lighter design and greater drive dynamics.

The method according to the embodiments of the present invention is advantageous in particular when the tubular film having more than two film layers, for example, four film layers, is compressed between the welding jaws, whereupon the film layers arranged in pairs are to be welded in pairs by means of ultrasonic vibrations applied to the tubular film via the sealing surface. With the cross-sealing method known in the past, such tubular films having more than two film layers cannot be welded by ultrasonic welding. Experiments have shown that ultrasonic cross-sealing with more than two film layers is possible with no problem by the method according to the embodiments of the present invention.

Essentially any desired ratio of the sealing force of the first sealing force maximum to the sealing force of the second sealing force maximum may be selected, as long as the sealing force of the first sealing force maximum is at any rate higher than the sealing force of the second sealing force maximum. It has proven to be particularly advantageous if the sealing force of the second sealing force maximum is in the range of about 30% to about 70% of the sealing force of the first sealing force maximum. It is particularly advantageous if the sealing force of the second sealing force maximum amounts to approximately half of the sealing force of the first sealing force maximum and is thus in the range of about 45% to about 55%.

Investigations with regard to the quality of the sealed seams have also shown that the sealing quality of the welds depends essentially on maintaining the sealing force during the first sealing force maximum, whereas the exposure time of the sealing force of the first sealing force maximum has only a very minor influence. In other words, this means that a very high-quality seal can be achieved by only applying the sealing force of the first sealing force maximum very briefly. According to a preferred variant of the method, it is therefore provided that the sealing force of the first sealing force maximum is formed by a short-term force peak. This short-term force peak and the short-term pressure pulse associated with it are sufficient to produce a sealed seam having a sufficient sealing quality.

If it is provided according to the proposed variant of the method that the sealing force of the first sealing force maximum is formed by a short-term force peak, then it is also advantageous if this short-term force peak is generated by short-term overload operation of the drive of the welding jaws. The power of the drive in overload operation should be higher than the maximum power of the drive in continuous load operation. As a result, it is thus possible for the drive of the welding jaws to be designed to operate at a lower load level, because the short-term force peaks for sealing the sealed seam can be achieved by a short-term overload operation. Conventional drive motors and the respective power electronics are usually tolerant with regard to a short-term overload, so the drive unit can be designed with a lower load level accordingly and is therefore also lighter and less expensive.

To be able to achieve the sealing force of the first sealing force maximum in the shortest possible time, the slope of the flank on the sealing force curve immediately before reaching the first sealing force maximum must correspond to the maximum power of the drive in overload operation.

Essentially it does not matter how the sealing force curve runs between the first sealing force maximum and the second sealing force maximum. According to a preferred variant of the method, after passing through the first sealing force maximum, the sealing force is reduced to the level of the sealing force (Fs2) of the second sealing force maximum (34) and is kept essentially constant at the sealing force (Fs2) of the second sealing force maximum (34) for a holding time (tH).

The holding time during which the sealing force is kept constant at the level of the second sealing force maximum should preferably end only when the material of the tubular film is at least partially melted and welded. At this point in time, the sealing force process can then be terminated by reducing the sealing force down to the zero level.

The method according to the present invention is characterized by the sealing force of the first sealing force maximum and the sealing force of the second sealing force maximum, which is below the former. To be able to adjust these two parameters variably to different boundary conditions, in particular to different film materials, the sealing force of the first sealing force maximum and/or the sealing force of the second sealing force maximum should be variably adjustable in the drive control unit. The sealing force curve can therefore be adapted variably to the different boundary conditions, in particular to the different film materials.

Furthermore, it is especially advantageous if the process time until reaching the first sealing force maximum and/or the process time until reaching the second sealing force maximum and/or the holding time is/are variably adjustable in the drive control unit in order to be able to optimally adapt the sealing force curve to the boundary conditions of the process.

After passing through the second sealing force maximum, the sealing force curve may have essentially any characteristic. For example, it is conceivable that it will then run through additional relative sealing force maximums. According to a first preferred variant of the process, it is provided that the sealing force is brought to zero by opening the welding jaws after passing through the second sealing force maximum. In other words, this means that after passing through the second sealing force maximum, the sealing force drops to zero within a short period of time.

As an alternative to this first variant of the process, it is also conceivable for the sealing force to be reduced to an interim value after passing through the second sealing force maximum and then be kept constant. As an alternative to this, however, an increase or decrease in the force is also conceivable. At the end of this constant force phase, during which the sealing force is kept at the interim level, the sealing force is then brought back to zero by opening the welding jaws.

The proposed method is suitable in particular for vertical or horizontal tubular bag machines that are operated continuously or in cycles. With such a packaging machine, the two welding jaws of a cross-sealing station may be moved along a linear path. It is preferable here for the welding jaws to be moved along a closed path having a straight section, such that the welding jaws moving with the tubular film will weld the tubular film along this straight section while the tubular film is moving.

The proposed method and a vertical tubular bag machine that can be operated by the proposed method are described below in greater detail on the basis of figures showing an exemplary embodiment.

Figure 2:
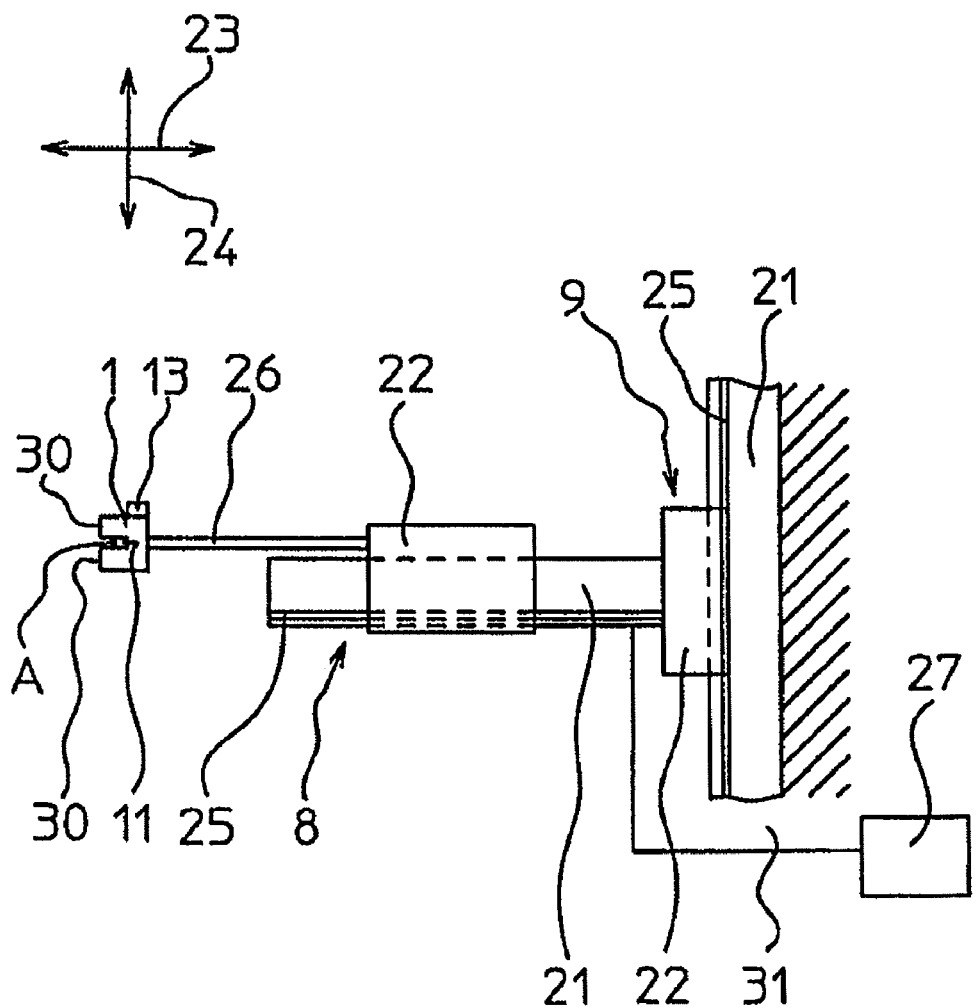
Figure 3:
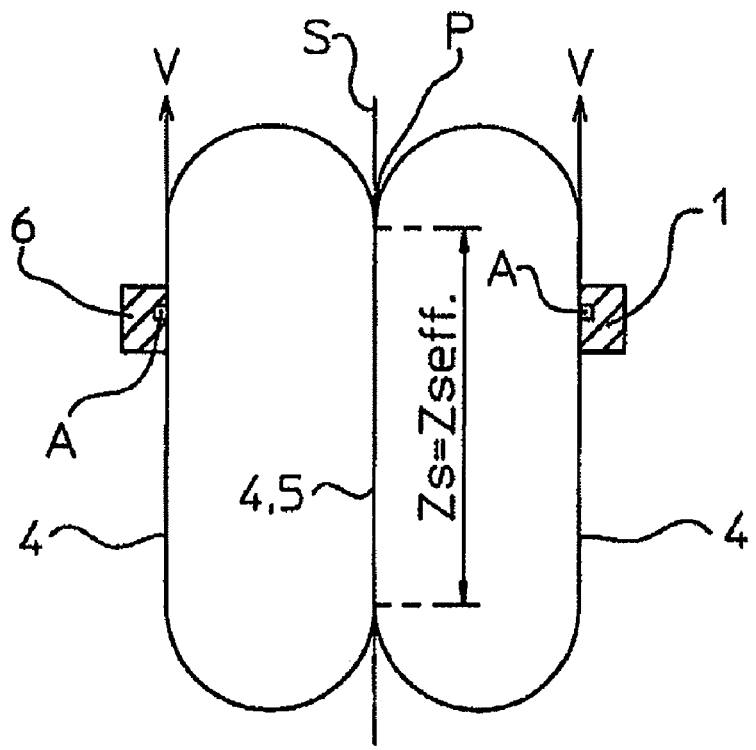
Figure 4:
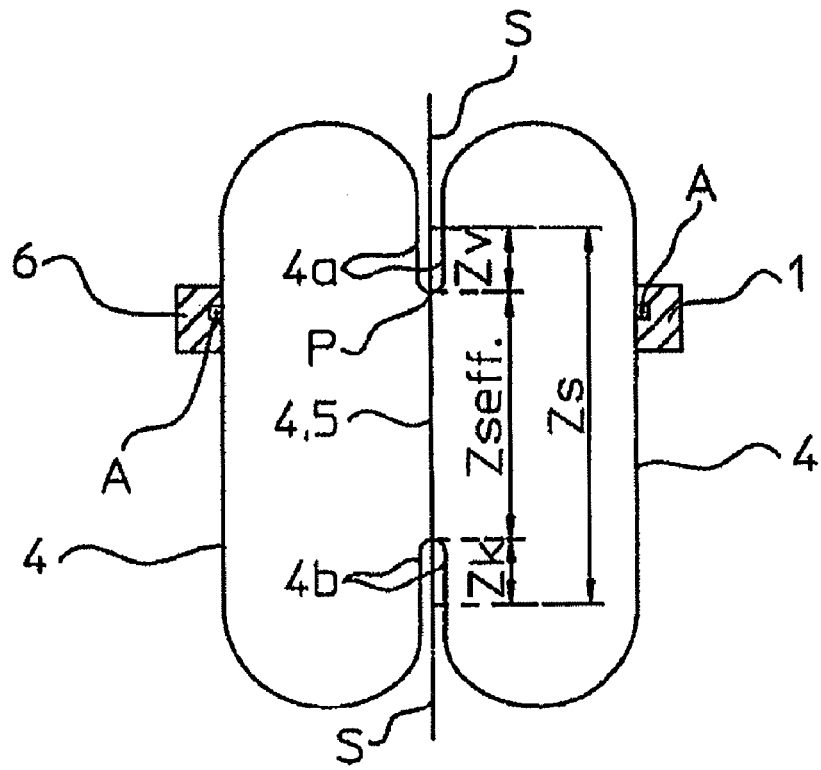
Figure 5:
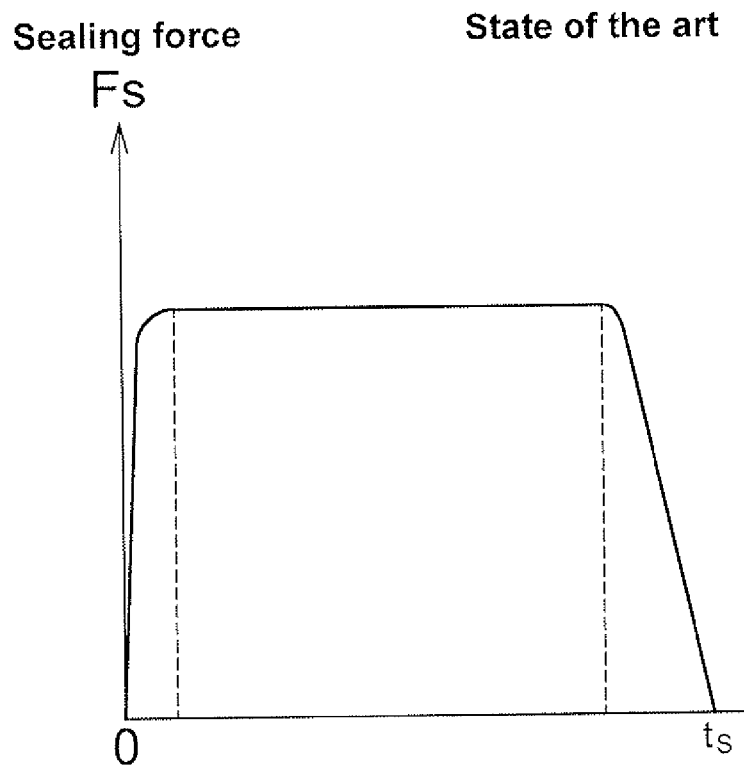
Figure 6:
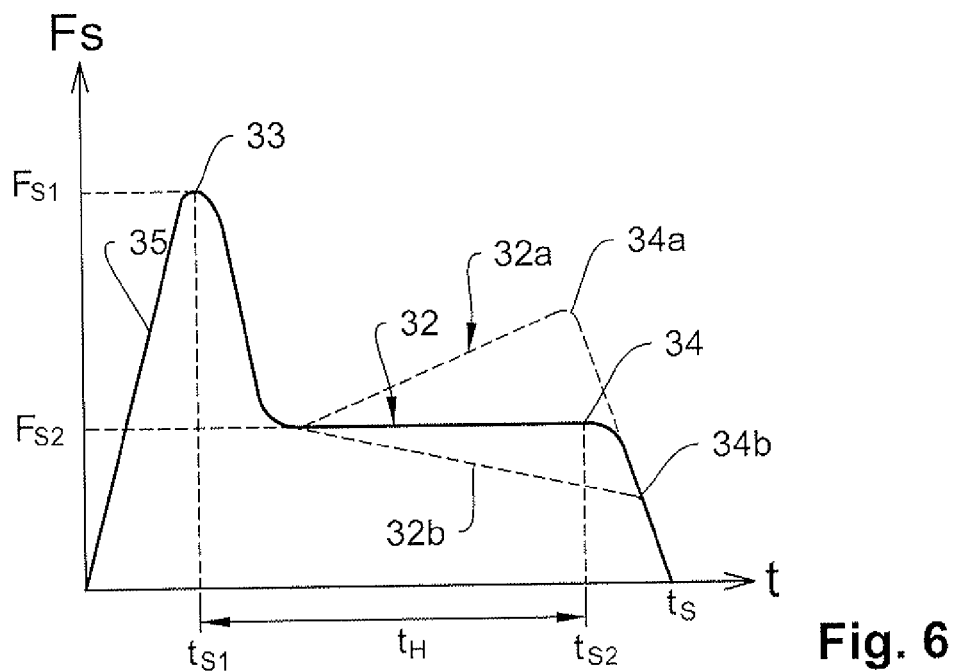
Figure 7:
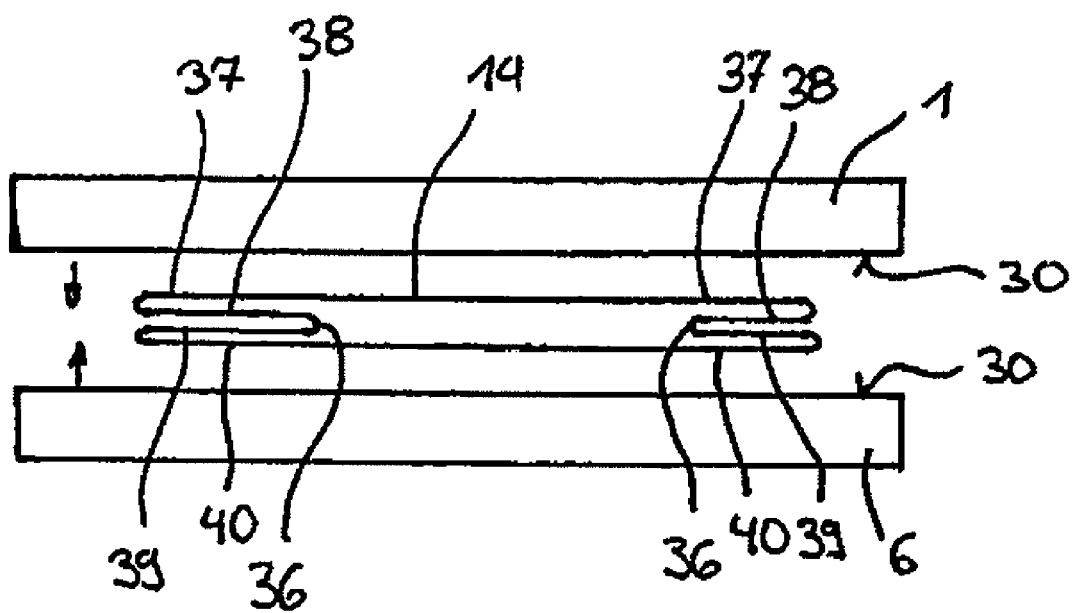

The drawings show:

FIG. 1: a side view of a vertical tubular bag machine having welding jaws of a cross-sealing station, the jaws being movable toward one another;

FIG. 2: a side view of two drives acting at right angles to one another for moving a moving point A of the one welding jaw of FIG. 1 along a peripheral path;

FIG. 3: a schematic diagram of the path of two welding jaws movable toward one another, which weld the tubular film according to FIG. 1 along an effective sealing path and which abut against one another at an impact point P;

FIG. 4: a schematic diagram of the welding jaw path according to FIG. 3, but with an effective sealing path reduced by a preheating zone and a cooling zone, and another impact point P;

FIG. 5: a diagram showing the known functional relationship, achieved by the traditional technique, between time and sealing pressure for the welding jaws of a cross-sealing station of a vertical tubular bag machine;

FIG. 6: a diagram of a sealing force profile according to the invention;

FIG. 7: a schematic diagram of the ultrasonic sealing of a tubular film, a portion of which is in four layers, between the welding jaws of the cross-sealing station according to FIG. 1.

In a vertical tubular bag machine 3, a film web 14 is pulled from a supply roll 16 by means of a draw-off device 15, passed over a shaping shoulder 17 and shaped to form a tubular film 7 (FIG. 1). The tubular film 7 is welded by a longitudinal sealing device 18 in the direction of conveyance 19 and is filled by a filling tube 20. Two peripheral welding jaws 1, 6, which are movable toward one another in a cross-sealing station 2, serve to weld the tubular film 7 across the direction of conveyance 19 by means of transverse seams 10. A cutting mechanism 11 in one welding jaw 1 serves to sever a tubular bag 12 having a certain bag length from the tubular film 7. The welding jaws 1, 6 are operated in such a way that they run in opposite directions to perform the welding of the tubular film 7, which is moving downward at the same speed as the welding jaws 1, 6, along an effective sealing path Zseff (FIG. 3). To do so, the two welding jaws 1, 6 are moved along a closed path 4. Each path 4 has a straight section 5, which is provided for contact with the tubular film 7 compressed between the welding jaws 1, 6. The tubular film and the welding jaws 1, 6 are moved further in the direction of the straight section 5 at a freely programmable speed to weld the tubular film 7 by the ultrasonic action of the welding jaws 1, 6 within a sealing time ts. The film web 14 of the tubular film 7 is partially fused by the ultrasonic vibrations applied to the sealing surfaces 30 of the welding jaws 1, 6, so that the melting areas which are opposite one another in pairs.

However, a sealing path Zs could also be provided, comprised of a preheating zone Zv for preheating the object with a welding jaw 1 at a distance from the object, the actual effective sealing distance at Zseff and a cooling zone Zk for cooling the object, while the welding jaw 1 is at a distance from the object, and while cooling air is blown onto the object from a cooling air outlet 13 provided on the welding jaw 1 (FIG. 4). In order for this adjustment of the sealing paths Zs with all the positional and chronological parameters to be readily possible, a section 4a, 5, 4b, which runs parallel to the straight section 5, is freely selectable with respect to its length and its position coordinates, and along which the moving point A being moved, was selected for the preheating zone Zv, the effective sealing distance Zseff and the cooling zone Zk, along this section. To do so, the drives 8, 9 (FIG. 2) are operated so that the two drives 8, 9 are operated simultaneously along the path of movement and are superimposed on one another. The straight sections 4a, 5, 4b as well as their precise lengths and position coordinates can be freely programmed. Precisely predetermined speeds may thus be preselected at precisely predetermined locations, and precisely predetermined accelerations for the welding jaws 1, 6 may also be predetermined in order to achieve smooth movement of the jaws. The reset time for renewed positioning of the welding jaws 1, 6 on the tubular film 7 and the cycle time (time for one revolution of the jaws) may also be selected freely. Suitable software establishes the desired relationship among the preselected parameters and informs the user of input data that does not fit together.

In order for the moving point A to be movable to a precise position, two drives 8, 9 acting at right angles to one another, each being embodied as electric drives, are provided for moving the welding jaws 1, 6. These may be two electromagnetic linear drives, for example. Instead of such linear drives, however, any other drive configurations, in particular with geared motors, are also conceivable. These drives 8, 9 are connected to a control unit 27 (via a line 31). To prevent any positional inaccuracy, the two drives 8, 9 are each connected to a gear or they are connected to each other and to a welding jaw 1, 6 without a gear. Secondly, movable elasticity is prevented by the fact that each welding jaw 1, 6 is connected to the movable part 22 of the horizontally acting drive 8 via a rigid connection 26, and the driving part 21 of this drive 8 is rigidly connected to the part 22 of the other drive 9 which is movable in the vertical direction. The freely selectable position coordinates allow an ideal movement of the jaws at each point on the path 4, even in the case of a relatively complex path.

The sealing surfaces 30 of the welding jaws 1, 6 strike one another at an impact point P (FIG. 3, FIG. 4) beyond which an effective sealing path Zseff begins. This impact point P lies in a sealing plane S. To achieve a gentle impact of the sealing surfaces 30 and thus to build up a sealing force (Fs), the normal component $V_N$ of a moving point A situated centrally or eccentrically in a sealing surface plane is controlled through corresponding control of the two drives 8, each of which moves one welding jaw 1, 6 in the normal direction, by the control unit 27, which is connected via a line 31 (FIG. 2) to a driving part 21 of a drive 8.

The sealing force Fs is predetermined by a control unit 27 of a force control of the drive 8 during the sealing time ts. In the case of cycled film transport, each welding jaw 1, 6 is moved along a linear path, and when the film is at a standstill and the welding jaws 1, 6 are in contact with the tubular film 7, a time-dependent sealing force Fs is predetermined by the control unit 27 during the sealing time ts. As an alternative to this in the case of continuous film transport, each welding jaw 1, 6 is moved along a closed path 4, which has a straight section 5, along which the welding jaw 1, 6 moving with the tubular film in the case of a moving tubular film 7 welds the tubular film 7, whereupon the sealing force Fs is predetermined by the control unit 27 as a function of time during the sealing time. Within the sealing period, a sealing force profile is achieved, because the drive 8, which generates the normal component and the sealing force Fs, is connected to the control unit 27 which preselects a chronological characteristic for the power consumption by the drive 8 and thus predetermines the sealing force 27. It does not matter whether the power consumption per se or a variable correlating with the power consumption is controlled and then is regulated as a function of time until reaching the sealing time ts.

In the known prior art (FIG. 5), the sealing force curve has an almost rectangular characteristic. The sealing force increases steeply up to its maximum value and is kept constant there for a certain sealing time. At the end of the sealing time, the jaws are then opened again and the sealing force drops to the value zero. A great deal of energy is squandered by this sealing force characteristic, which is known in the prior art, because a high sealing force is not necessary at the start of the sealing process in order to achieve a high-quality seal. A much lower pressing force is sufficient for input of the necessary heat into the material of the tubular film.

FIG. 6 shows the sealing force curve in one exemplary embodiment of the method according to the present invention. Accordingly, the sealing force curve according to the invention initially increases up to the sealing force Fs1 at a first relative sealing force maximum 33. As soon as the curve passes through this first sealing force maximum 33, which is formed by a short-term force peak, the sealing force 32 drops to the level of the sealing force Fs2 of the second sealing force maximum 34 and remains essentially constant there for a holding time tH. As an alternative to that, the sealing force 32a and/or 32b may be increased linearly or decreased linearly after the decline until reaching the second sealing force maximum 34a and/or 34b. Other sealing force curves are fundamentally also conceivable through appropriate programming of the sealing force characteristic.

At the end of the holding time tH, the sealing force 32 is then reduced back to a level of zero by opening the welding jaws 1 and 6. The duration of the holding time tH is coordinated, so that the film to be welded is at least partially fused and welded on reaching the end of the holding time tH. The sealing force maximum 33 forms a short-term force peak, which is transferred to the film in a short-term maximum pressure pulse. To achieve this short-term force peak of the sealing force characteristic at the first sealing force maximum, the drive 8 and/or the drive 9 of the two welding jaws is/are operated briefly in overload mode, so that the drives 8 and 9 can be designed with smaller dimensions accordingly in normal operation. After passing through the second sealing force maximum 34, the welding jaws 1 and 6 are moved apart and the sealing force therefore drops to a level of zero. To be able to increase the sealing force 32 to the first sealing force maximum 33 as rapidly as possible, the slope of the flank on the sealing force curve 32 immediately before reaching the second sealing force maximum corresponds to the maximum power of the drive 8 and/or 9 in overload operation.

FIG. 7 shows in a schematic diagram the ultrasonic sealing of a tubular film 7, some of which is in four layers between the welding jaws 1 and 6 of the cross-sealing station 2 according to FIG. 1. The outer edges 36 of the tubular film 7 are folded in the area of the cross-sealing seams, so that the film web 14 in the folded areas lies in four film layers 37, 38, 39 and 40. The film layers 37 and 38 and/or the film layers 39 and 40 are welded together in pairs by ultrasonic vibrations applied to the sealing surfaces 30 with the welding jaws 1 and 6. Due to the use of the method according to the present invention, a reliable ultrasonic sealing is also achieved in those areas where the film web 14 is in four layers, one above the other.

The invention claimed is:

1. A method for creating a welding force and/or a welding pressure for a welding jaw, in particular a welding jaw of a cross-sealing station (2) of a vertical tubular bag machine, wherein the welding jaw is moved back and forth along a linear path or is moved along a closed path to strike a resistance, in particular a second welding jaw moving in the opposite direction, wherein a tubular film is compressed between the resistance and at least one of the sealing surfaces of the welding jaws to weld the tubular film by means of ultrasonic vibrations applied to the tubular film via the sealing surface at an applied pressure in a sealing plane under a sealing force (Fs) within a sealing time (ts), and wherein at least one drive is provided to move the welding jaws back and forth in a direction normal to the surface of the resistance in order to perform the welding operation in a stationary position or along an effective sealing path (Zseff) within the sealing time (ts), and wherein the sealing force (Fs) or a sealing parameter which correlates with the sealing force (Fs), in particular the sealing pressure or the drive power of the drive, is predetermined by a control unit during the sealing time (ts), such that the sealing force (Fs) runs along a sealing force curve within the sealing time (ts), wherein
the sealing force curve has a first relative sealing force maximum with a sealing force (Fs1), and has at least one second relative sealing force maximum with a sealing force (Fs2), such that the sealing force (Fs1) at the first sealing force maximum is higher than the sealing force (Fs2) at the second sealing force maximum.

2. The method according to claim 1, wherein the tubular film having more than two film layers arranged in pairs, in particular in four film layers, is compressed between the welding jaws such that the film layers arranged in pairs are welded in pairs by means of ultrasonic vibrations applied to the tubular film via the sealing surface.

3. The method according to claim 1, wherein the sealing force (Fs2) of the second sealing force maximum is in the range of about 30% to about 70%, in particular in the range of about 45% to about 55% of the sealing force (Fs1) of the first sealing force maximum.

4. The method according to claim 1, wherein the sealing force (Fs1) of the second sealing force maximum is formed by a short-term force peak.

5. The method according to claim 4, wherein the short-term force peak of the second sealing force maximum is created by a short-term overload operation of the drive of the welding jaws.

6. The method according to claim 1, wherein the slope of the flank on the sealing force curve corresponds to the maximum power of the drive in overload operation immediately before reaching the first sealing force maximum.

7. The method of claim 1 wherein the sealing roce (Fs2) of the second sealing force maximum is in the range of about 45% to about 55% of the sealing force (Fs1) of the first sealing force maximum.

8. The method according to claim 1, wherein the sealing force (Fs) is reduced to the value of the sealing force (Fs2) of the second sealing force maximum after passing through the first sealing force maximum and is kept essentially at a constant level at the sealing force (Fs2) of the second sealing force maximum for a holding time (tH).

9. The method according to claim 8, wherein the holding time (tH) ends only when the molten layer of the tubular film is at least partially fused and welded.

10. The method according to claim 1, wherein the sealing force (Fs1) of the first sealing force maximum and/or the sealing force (Fs2) of the second sealing force maximum is/are variably adjustable in the drive control unit.

11. The method according to claim 1, wherein the time (ts1) into reaching the first sealing force maximum and/or the time (ts2) until reaching the second sealing force maximum and/or the holding time (tH) is/are variably adjustable in the drive control unit.

12. The method according to claim 1, wherein after passing through the second sealing force maximum, the sealing force (Fs) is reduced to zero by opening the welding jaws.

13. The method according to claim 1, wherein the sealing force (Fs) after passing through the second sealing force maximum is reduced to an interim value and then is held there, in particular being kept constant, and only then is brought to zero by opening the welding jaws.

14. The method according to claim 1, wherein the welding jaws are moved along a closed path, which has a straight section along which the welding jaws, moving together with the tubular film when the tubular film is moving, weld the tubular film.

* * * * *